United States Patent
Tourgee et al.

(10) Patent No.: US 6,542,675 B1
(45) Date of Patent: Apr. 1, 2003

(54) APPARATUS AND METHOD TO USE A TAPERED FIBER BUNDLE IN A FREE SPACE OPTICAL COMMUNICATION SYSTEM

(75) Inventors: Gerald Edward Tourgee, Convent Station, NJ (US); Pierre Robert Barbier, Sammamish, WA (US); David Lawrence Rollins, Woodinville, WA (US); Timothy Alan Sochor, Middletown, NJ (US); John Walker Robinson, III, Great Meadows, NJ (US)

(73) Assignee: Terabeam Corporation, Kirkland, WA (US)

( * ) Notice: Subject to any disclaimer, the term of this patent is extended or adjusted under 35 U.S.C. 154(b) by 22 days.

(21) Appl. No.: 09/847,891

(22) Filed: May 2, 2001

(51) Int. Cl.[7] .............................. G02B 6/26; G02B 6/42
(52) U.S. Cl. ......................... 385/115; 385/43; 385/24; 385/48; 385/46
(58) Field of Search ........................... 385/43–48, 115, 385/24, 34, 30, 27, 15, 50, 147

(56) References Cited

U.S. PATENT DOCUMENTS

| | | | | |
|---|---|---|---|---|
| 5,016,963 A | * | 5/1991 | Pan | 385/115 |
| 5,138,677 A | * | 8/1992 | O'Shaughnessy et al. | 250/227.11 |
| 5,408,556 A | * | 4/1995 | Wong | 385/15 |
| 5,949,931 A | * | 9/1999 | Kitamura | 385/129 |

* cited by examiner

Primary Examiner—Hemang Sanghavi
Assistant Examiner—Scott Knauss
(74) Attorney, Agent, or Firm—Blakely Sokoloff Taylor & Zafman LLP

(57) ABSTRACT

An apparatus and method implements a first plurality of single-mode optical fibers into which to inject wavelength division multiplexed (WDM) optical signals. A tapered fiber bundle (TFB) is coupled to the first plurality of single-mode optical fibers, with the TFB including a second plurality of fused single-mode optical fibers correspondingly coupled to the first plurality of single-mode optical fibers at a first end of the TFB. The second plurality of fused single-mode optical fibers are capable to receive the WDM optical signals from the first plurality of single-mode optical fibers at the first end and to provide the WDM optical signals to a free space optical communication path at a second end.

18 Claims, 2 Drawing Sheets

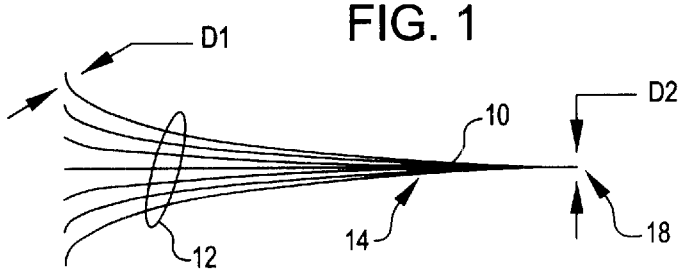
FIG. 1
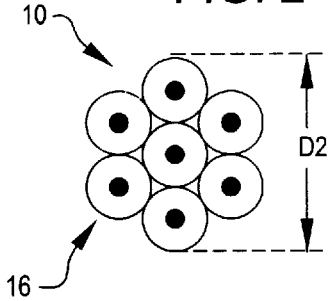
FIG. 2
FIG. 3
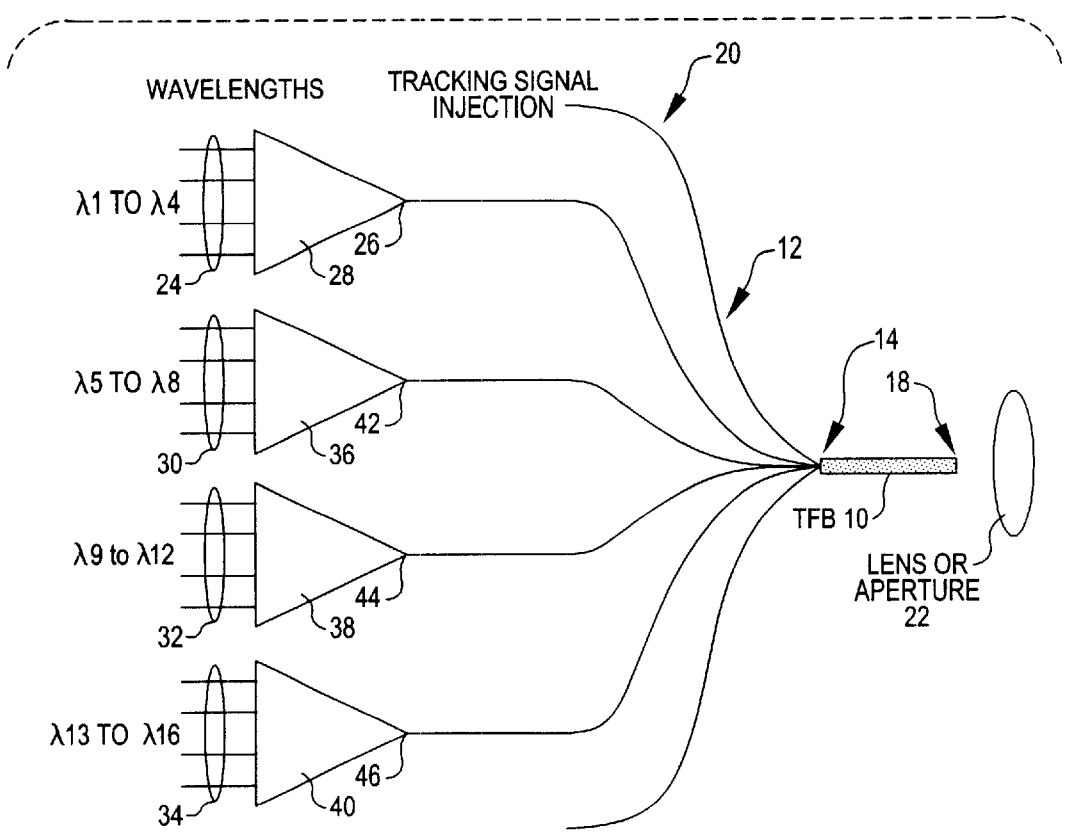

APPARATUS AND METHOD TO USE A TAPERED FIBER BUNDLE IN A FREE SPACE OPTICAL COMMUNICATION SYSTEM

TECHNICAL FIELD

This disclosure relates generally to wireless communication systems, and in particular but not exclusively, relates to use of a tapered fiber bundle (TFB) for high-power coupling at a single transmission aperture optical terminal in a free space optical communication system.

BACKGROUND

Current techniques for wavelength division multiplexing (WDM) of channels for transmission of optical signals through free space have their limitations and disadvantages. For example, signals are multiplexed onto a single fiber prior to free space transmission. WDM devices to implement this multiplexing are low-power devices that generally require multiplexing to occur prior to power amplification. This pre-amplification multiplexing in turn requires implementation of a single high-power amplifier that is capable to provide all of the power required for a WDM system. Use of the single high-power amplifier generates problems associated with non-linear effects within the high-power amplifier, and within the fiber between the high-power amplifier and a transmit aperture. Overly high-powered signals in an optical amplifier and in downstream optical fiber will cause distortion, such as 4-wave mixing, which will cause crosstalk among the optical channels, and thus result in bit errors at a receive terminal. Thus when high optical power levels per wavelength are required, only a limited number of wavelengths can be amplified together without introducing severe performance penalties.

WDM systems sometimes use a multiple-IN/single-OUT coupler just before the transmit aperture, with one or more high-power amplifiers at an input side of the coupler amplifying the signals that are input into the coupler. However, use of such a coupler results in significant power loss on the output side of the coupler. For example, a 4-to-1 coupler results in a 6-dB (or 3/4) drop in power, after amplification. Therefore, the cost of the amplification is borne, and then power is discarded (e.g., much of the amplification provided by the high-power amplifier is "thrown away" by the coupler for the sake of obtaining the single output).

WDM systems sometimes use fiber-based WDM couplers that combine separate wavelength bands together with minimal optical insertion loss. However, these couplers can have problems handling extremely high optical power levels (e.g., multiple watts). Even fiber connectors can have reliability problems with the extremely high power levels that would result from combining a large number of high-power optical amplifier outputs.

In some instances, an optical terminal with multiple transmit apertures may be used as a relatively simple solution to multiplexing. However, the optical terminal has increased complexity in both design and co-alignment of the optical transmit apertures to each other and to a receive aperture at the receive terminal.

In addition to these limitations and disadvantages, the various implementations described above are costly when reliability and scalability are considered. Therefore, improvements are needed in the transmission of optical signals.

SUMMARY OF THE INVENTION

According to an aspect of the invention, an apparatus includes a first plurality of single-mode optical fibers into which to inject wavelength division multiplexed (WDM) optical signals. A tapered fiber bundle (TFB) is coupled to the first plurality of single-mode optical fibers, with the TFB including a second plurality of fused single-mode optical fibers correspondingly coupled to the first plurality of single-mode optical fibers at a first end of the TFB. The second plurality of fused single-mode optical fibers are capable to receive the WDM optical signals from the first plurality of single-mode optical fibers at the first end and to provide the WDM optical signals to a free space optical communication path at a second end.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 1 is a simplified side view showing a tapered fiber bundle (TFB) according to an embodiment of the invention.

FIG. 2 is a simplified cross-sectional view of the TFB of FIG. 1.

FIG. 3 is a block diagram of an embodiment of an apparatus that can implement the TFB of FIGS. 1–2.

DETAILED DESCRIPTION OF THE ILLUSTRATED EMBODIMENTS

Figure 4:
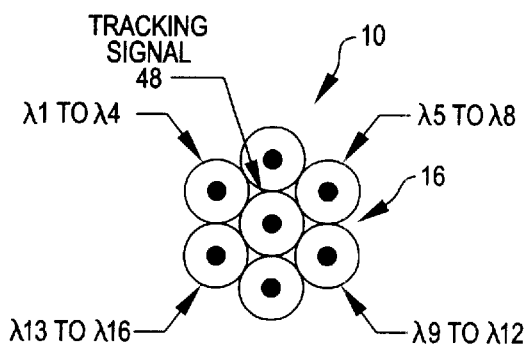
FIG. 4 is a simplified cross-sectional view of the TFB of FIG. 1 showing distribution of optical signals for the apparatus of FIG. 3 according to an embodiment of the invention.

Embodiments of an apparatus and method for using a tapered fiber bundle (TFB) for free space optical communication are described herein. In the following description, numerous specific details are provided, such as various dimensions of individual components of optical fiber and of a TFB, to provide a thorough understanding of embodiments of the invention. One skilled in the relevant art will recognize, however, that the invention can be practiced without one or more of the specific details, or with other methods, components, dimensions, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Additionally, the cross-sectional views of the TFB in the various figures are intended to be illustrative and simplified, and as such, are not necessarily drawn to scale or to exact shapes. A person skilled in the art will also appreciate that the exact shape(s) and contour(s) of the TFB may vary from one situation to another, based on factors such as differences in manufacturing techniques, types of TFB materials used, particular implementation for the TFB, and the like.

As an overview, an embodiment of the invention provides a TFB that places cores of optical fibers closer together than they normally would be otherwise. Use of the TFB reduces the total optical losses between (1) multiple high-powered optical amplifier outputs, which must feed into the transmit free-space optical telescope, and (2) the detector or receive fiber in the receive free-space optical telescope. An embodiment of the TFB performs does this by eliminating fiber-based multiplexing, and instead uses free-space combining in the transmit telescope itself. The TBF reduces the fiber core-to-core spacing, thereby reducing the effective transmit area, and thus minimizes extra free-space losses introduced by an enlarged transmit beam divergence and by an enlarged receive spot size in the receive telescope (e.g., excess coupling loss). These results can be achieved without significant cost increases or reliability degradations.

Referring first to FIG. 1, a simplified side view of a TFB 10 according to an embodiment of the invention is shown. The TFB 10 comprises an optical device having a plurality of optical fibers that have been drawn and fused together under applied heating and tension. The result is an overall reduction in dimensions (e.g., thickness) of both the core and the outer diameter of each of the optical fibers in the TFB 10 (including the cladding). With this drawing and heating, the core-to-cladding dimensional ratio of the individual optical fibers of the TFB 10 remain substantially constant.

The embodiment of the TFB 10 of FIG. 1 shows the TFB 10 coupled to a first plurality of optical fibers 12 at a first end 14 of the TFB 10. The TFB 10 may be coupled to the first plurality of optical fibers 12 by virtue of being formed (e.g., heated and drawn) from that same first plurality of optical fibers 12. In another embodiment, the TFB 10 may be formed separately from other optical fibers, subsequently cut, and then spliced or otherwise suitably coupled at its first end 14 to the first plurality of optical fibers 12. Therefore in this embodiment, it is possible to provide the TFB 10 where individual ones of its optical fibers have dimensions that are different (or the same) as dimensions of individual ones of the first plurality of optical fibers 12. The individual ones of the first plurality of optical fibers 12 may in turn be coupled to other optical fibers that may have the same or different dimensions.

In an embodiment, the first plurality of optical fibers 12 and a second plurality of optical fibers 16 of the TFB 10 (see, e.g., FIG. 2) comprise single-mode optical fibers. Example dimensions D1 of each of the optical fibers in the first plurality of optical fibers 12 (prior to being heated and drawn) can be 25 microns for the core and 125 microns for the outer diameter (for a core-to-cladding dimensional ratio of approximately 5:1). This larger initial diameter for the core allows an approximately 8.5-micron to 9.0-micron core diameter to be obtained for the TFB 10 after heating and drawing. Thus, for instance, final dimensions of the TFB 10 can be approximately 9.0 microns for the core and 45 microns for each individual optical fiber (maintaining the core-to-cladding dimensional ratio of approximately 5:1), for an overall diameter dimension D2 of approximately 135 microns at a second end 18 of the TFB 10. Thus, a resultant reduction ratio of approximately 3:1 is obtained, and the second end 18 of the TFB 10 can have roughly the same diameter as a single one of the first plurality of optical fibers 12.

FIG. 2 is a simplified cross-sectional view of the TFB 10 of FIG. 1, showing the second plurality of optical fibers 16 that have been fused and showing the overall diameter dimension D2. In one embodiment, the second plurality of optical fibers 16 of the TFB 10 comprises seven fused single-mode optical fibers. Use of seven optical fibers allows the TFB 10 to have a generally symmetrical shape. It is to be appreciated that the second plurality of optical fibers 16 can have any suitable number of optical fibers, based on factors such as number of optical fibers needed for a particular implementation, amount of symmetry needed, manufacturing considerations, and the like.

FIG. 3 is a block diagram of an embodiment of an apparatus 20 that can implement the TFB 10 of FIGS. 1–2. The apparatus 20 can form part of a transceiver unit for a free space optical communication system. Via use of the TFB 10, the apparatus 20 can transmit one or more optical signals (such as laser light having data modulated thereon at 2.5 Gbps) to another transceiver or other receive terminal.

An embodiment of the apparatus 20 includes the first plurality of single-mode optical fibers 12 into which to inject wavelength division multiplexed (WDM) optical signals. How these WDM signals are generated will be described later below. The TFB 10 is coupled to the first plurality of single-mode optical fibers 12, with the second plurality of fused single-mode optical fibers 16 of the TFB 10 being correspondingly coupled to the first plurality of single-mode optical fibers 12 at the first end 14 of the TFB 10.

The second plurality of fused single-mode optical fibers 16 of the TFB 10 is capable to receive the WDM optical signals from the first plurality of single-mode optical fibers 12 at the first end 14, and to provide the WDM optical signals to a free space optical communication path at the second end 18. A lens or other single transmit aperture 22 is positioned adjacent to the second end 18 of the TFB 10. The TFB 10 can provide the WDM optical signals to the free space optical communication path through the transmit aperture 22.

An embodiment of the apparatus 20 further includes a plurality 24 of input optical fibers. Each of the input optical fibers of the plurality 24 is capable to provide an optical input signal having a wavelength λ that is different from wavelengths of other optical input signals provided by other input optical fibers in the plurality 24. For instance in FIG. 3, four separate input optical signals, having wavelengths λ1 to λ4, are correspondingly provided on the four optical fibers of the plurality 24.

A multiplexer is coupled to the plurality 24 of input optical fibers to wavelength division multiplex the optical input signals, thereby resulting in generation of one WDM optical signal. An amplifier has an input coupled to the multiplexer to amplify that WDM optical signal generated by the multiplexer, and has an output 26 coupled to one of the first plurality of single-mode optical fibers 12 to inject the amplified WDM optical signal into that particular single-mode optical fiber. In an embodiment, the multiplexer and the amplifier can be disposed in a same unit, and therefore, FIG. 1 shows the multiplexer and amplifier symbolically and collectively as a single unit 28.

To provide additional WDM signals to the other optical fibers of the first plurality of single-mode optical fibers 12, the apparatus 20 can further include a plurality of additional input optical fibers, shown at 30, 32, and 34. Each of the additional input optical fibers 30, 32, and 34 is capable to provide an optical input signal having a wavelength λ that is different from wavelengths of other optical input signals provided by other optical fibers. For instance, the optical fibers 30 can provide four separate input optical signals having wavelengths λ5 to λ8, the optical fibers 32 can provide four separate input optical signals having wavelengths λ9 to λ12, the optical fibers 34 can provide four separate input optical signals having wavelengths λ13 to λ16, and so on.

Additional units 36, 38, and 40 include a plurality of additional multiplexers that are correspondingly coupled to the additional plurality of input optical fibers 30, 32, and 34. These multiplexers wavelength division multiplex the optical input signals provided from the additional plurality of input optical fibers 30, 32, and 34 to generate other WDM optical signals. The units 36, 38, and 40 also include a plurality of additional amplifiers having an input coupled to corresponding ones of the multiplexers to amplify the WDM optical signal generated by the corresponding multiplexer.

The units 36, 38, and 40 have outputs 42, 44, and 46 coupled to corresponding optical fibers of the first plurality of single-mode optical fibers 12. This allows the units 36, 38, and 40 to inject their amplified WDM optical signals into the corresponding single-mode optical fiber, which is then eventually transmitted from the optical fibers of the TFB 10 into the free space optical communication path.

FIG. 4 is a simplified cross-sectional view of the TFB 10 of FIG. 1 showing an example distribution of optical signals, such as the WDM optical signals generated by the units 28, 36, 38, and 40, for the apparatus 20 of FIG. 3 according to an embodiment of the invention. Because there has been a reduction in the size/dimension of the individual optical fibers of the plurality of optical fibers 16 within the TFB 10, a core-to-core distance between these fibers can be approximately 40 microns, for example. This reduction allows for high-power coupling at the transmit aperture 22, and also allows the light to be more readily collected and coupled to a multi-mode optical fiber (having a core diameter of 62.5 microns, for example) at the receive terminal (not shown), since the light more closely resembles or emulates a single-point transmission.

In the example distribution shown in FIG. 4, the WDM optical signals having the various wavelengths λ1 to λ4, λ5 to λ8, and so on are separated and can be distributed along the outer optical fibers of the TFB 10. It is possible that some of the optical fibers may be unused in some embodiments. It is also possible, in an embodiment, to inject a tracking signal 48 (or other ancillary signal) into one of the second plurality of fused single-mode optical fibers 16, such as into a center optical fiber or into one of the outer optical fibers.

Figure 5:
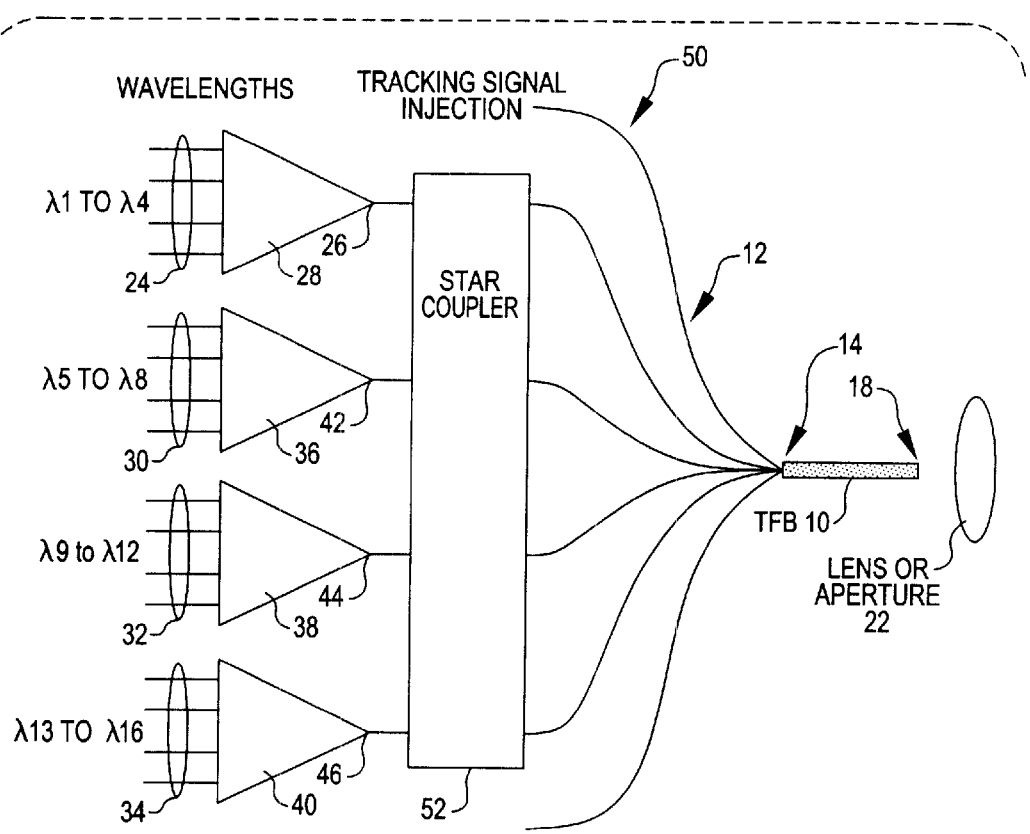
FIG. 5 is a block diagram of another embodiment of an apparatus that can implement the TFB of FIGS. 1–2.

FIG. 5 is a block diagram of another embodiment of an apparatus 50 that can implement the TFB 10 of FIGS. 1–2. The apparatus 50 includes similar input optical signals and units 28, 36, 38, and 40 as the apparatus 20 of FIG. 3, except an embodiment of the apparatus 50 includes a star coupler 52. In one embodiment, the star coupler 52 comprises a 4×4 star coupler, and it is to be appreciated that other types of star couplers may be used in other embodiments.

The star coupler 52 operates to equally divide its input channels to its output channels, with the result being that each optical fiber of the TFB 10 carries all of the channels (e.g., portions of all of the WDM optical signals). Consequently, this eliminates any biased dropping of channels at the receive terminal due to misalignment, since any particular spot(s) that are detected at the receive terminal will have data from all of the channels (and therefore compensates for spots that may be undetected due to misalignment).

For the embodiment of the apparatus 50 of FIG. 5, the units 28, 36, 38, and 40 include the plurality of amplifiers that have inputs coupled to corresponding multiplexers. Each amplifier amplifies an intermediate optical signal (e.g., a wavelength division multiplexed signal comprising the optical input signals having wavelengths λ1 to λ4, λ5 to λ8, and so on) that is generated by the corresponding multiplexer. The amplifiers have an output (e.g., the outputs 26, 42, 44, or 46) to provide that amplified intermediate optical signal to inputs of the star coupler 52. The star coupler 52 has outputs coupled to corresponding optical fibers of the first plurality of single-mode optical fibers 12.

Based on the amplified intermediate optical signals received from the amplifiers, the star coupler 52 is capable to provide the WDM optical signals, each having the wavelengths λ1 to λ16 of all the optical input signals, to each of the first plurality of single-mode optical fibers 12, and subsequently to the TFB 10. That is, the star coupler 52 equally divides each input intermediate signal between its outputs, such that a signal having all wavelengths λ1 to λ16 is provided to each optical fiber of the TFB 10.

Figure 6:
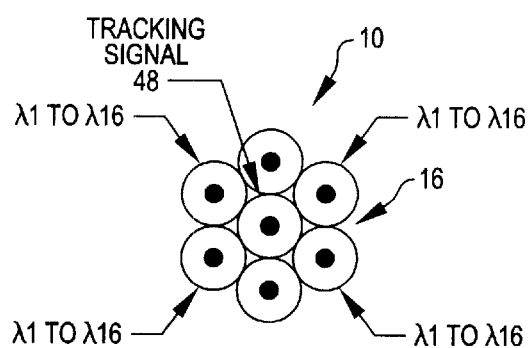
FIG. 6 is a simplified cross-sectional view of the TFB of FIG. 1 showing distribution of optical signals for the apparatus of FIG. 5 according to an embodiment of the invention.

FIG. 6 is a simplified cross-sectional view of the TFB 10 of FIG. 1 showing distribution of optical signals for the apparatus 50 of FIG. 5 according to an embodiment of the invention. As depicted in the example of FIG. 5, each optical fiber of the second plurality of single-mode optical fibers 16 of the TFB 10 (with the exception of optical fibers that are unused or used for the tracking signal 48) carries a WDM optical signal having common wavelengths λ1 to λ16.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a first plurality of single-mode optical fibers into which to inject wavelength division multiplexed (WDM) optical signals;
   a plurality of input optical fibers, each of the input optical fibers capable to provide an optical input signal having a wavelength different from wavelengths of other optical input signals provided by other input optical fibers in the plurality;
   a multiplexer coupled to the plurality of input optical fibers to wavelength division multiplex the optical input signals provided from the plurality of input optical fibers to generate one of the WDM optical signals;
   an amplifier having an input coupled to the multiplexer to amplify the one WDM optical signal generated by the multiplexer and having an output coupled to one of the first plurality of single-mode optical fibers to inject the amplified one WDM optical signal into that single-mode optical fiber; and
   a tapered fiber bundle (TFB) coupled to the first plurality of single-mode optical fibers, the TFB including a second plurality of fused single-mode optical fibers correspondingly coupled to the first plurality of single-mode optical fibers at a first end of the TFB, the second plurality of fused single-mode optical fibers capable to receive the WDM optical signals from the first plurality of single-mode optical fibers at the first end and to provide the WDM optical signals to a free space optical communication path at a second end.

2. The apparatus of claim 1, further comprising a single transmit aperture adjacent to the second end of the TFB through which the TFB provides the WDM optical signals to the free space optical communication path.

3. The apparatus of claim 1 wherein dimensions of individual ones of the second plurality of fused single-mode optical fibers are different from dimensions of individual ones of the first plurality of single-mode optical fibers.

4. The apparatus of claim 1, further comprising:
a plurality of additional input optical fibers, each of the additional input optical fibers capable to provide an optical input signal having a wavelength different from wavelengths of other optical input signals provided by other ones of the additional input optical fibers;
a plurality of additional multiplexers correspondingly coupled to the additional plurality of input optical fibers to wavelength division multiplex the optical input signals, provided from the additional plurality of input optical fibers, to generate other ones of the WDM optical signals; and
a plurality of additional amplifiers having an input coupled to corresponding ones of the additional multiplexers to amplify the WDM optical signal generated by the corresponding additional multiplexer and having an output coupled to corresponding ones of the first plurality of single-mode optical fibers to inject their amplified WDM optical signal into that corresponding single-mode optical fiber.

5. The apparatus of claim 1 wherein the second plurality of fused single-mode optical fibers comprises seven fused single-mode optical fibers.

6. The apparatus of claim 1 wherein one of the second plurality of single-mode optical fibers is capable to be injected with a tracking signal.

7. The apparatus of claim 1, wherein the second plurality of fused single-mode optical fibers have tapered fiber cores and cladding at a tapered end and are fused together via the cladding at a second end of the TFB.

8. An apparatus comprising:
a first plurality of single-mode optical fibers into which to inject wavelength division multiplexed (WDM) optical signals;
a plurality of input optical fibers, each of the additional input optical fibers capable to provide an optical input signal having a wavelength different from wavelengths of other optical input signals provided by other ones of the input optical fibers;
a plurality of multiplexers correspondingly coupled to the plurality of input optical fibers to wavelength division multiplex the optical input signals, provided from the plurality of input optical fibers, to generate intermediate optical signals;
a plurality of amplifiers having an input coupled to corresponding ones of the multiplexers to amplify the intermediate optical signal generated by the corresponding multiplexer and having an output to provide that amplified intermediate optical signal;
a star coupler having inputs coupled to corresponding outputs of the plurality of amplifiers to receive the amplified intermediate optical signals and having outputs coupled to corresponding ones of the first plurality of single-mode optical fibers, and
a tapered fiber bundle (TFB) coupled to the first plurality of single-mode optical fibers, the TFB including a second plurality of fused single-mode optical fibers correspondingly coupled to the first plurality of single-mode optical fibers at a first end of the TFB, the second plurality of fused single-mode optical fibers capable to receive the WDM optical signals from the first plurality of single-mode optical fibers at the first end and to provide the WDM optical signals to a free space optical communication path at a second end.

9. The apparatus of claim 8 wherein the star coupler comprises a 4×4 star coupler.

10. A system, comprising:
a transmitter unit including:
a first plurality of single-mode optical fibers into which to inject wavelength division multiplexed (WDM) optical signals;
a plurality of input optical fibers, each of the input optical fibers capable to provide an optical input signal having a wavelength different from wavelengths of other optical input signals provided by other input optical fibers in the plurality;
a multiplexer coupled to the plurality of input optical fibers to wavelength division multiplex the optical input signals provided from the plurality of input optical fibers to generate one of the WDM optical signals;
an amplifier having an input coupled to the multiplexer to amplify the one WDM optical signal generated by the multiplexer and having an output coupled to one of the first plurality of single-mode optical fibers to inject the amplified one WDM optical signal into that single-mode optical fiber; and
a tapered fiber bundle (TFB) coupled to the first plurality of single-mode optical fibers, the TFB including a second plurality of fused single-mode optical fibers correspondingly coupled to the first plurality of single-mode optical fibers at a first end of the TFB, the second plurality of fused single-mode optical fibers capable to receive the WDM optical signals from the first plurality of single-mode optical fibers at the first end and to provide the WDM optical signals to a free space optical communication path at a second end; and
a receiver unit along the free space optical communication path, the receiver unit including a multi-mode optical fiber to receive the WDM optical signals provided from the second end of the TFB.

11. The system of claim 10 wherein the transmitter unit further includes:
a plurality of additional input optical fibers, each of the additional input optical fibers capable to provide an optical input signal having a wavelength different from wavelengths of other optical input signals provided by other ones of the additional input optical fibers;
a plurality of additional multiplexers correspondingly coupled to the additional plurality of input optical fibers to wavelength division multiplex the optical input signals, provided from the additional plurality of input optical fibers, to generate other ones of the WDM optical signals; and
a plurality of additional amplifiers having an input coupled to corresponding ones of the additional multiplexers to amplify the WDM optical signal generated by the corresponding additional multiplexer and having an output coupled to corresponding ones of the first plurality of single-mode optical fibers to inject their amplified WDM optical signal into that corresponding single-mode optical fiber.

12. The system of claim 10 wherein the transmitter unit further comprises a single transmit aperture adjacent to the second end of the TFB through which the TFB provides the WDM optical signals to the free space optical communication path.

13. A system comprising:

a transmitter unit including:

a first plurality of single-mode optical fibers into which to inject wavelength division multiplexed (WDM) optical signals;

a plurality of input optical fibers, each of the additional input optical fibers capable to provide an optical input signal having a wavelength different from wavelengths of other optical input signals provided by other ones of the input optical fibers;

a plurality of multiplexers correspondingly coupled to the plurality of input optical fibers to wavelength division multiplex the optical input signals, provided from the plurality of input optical fibers, to generate intermediate optical signals;

a plurality of amplifiers having an input coupled to corresponding ones of the multiplexers to amplify the intermediate optical signal generated by the corresponding multiplexer and having an output to provide that amplified intermediate optical signal;

a star coupler having inputs coupled to corresponding outputs of the plurality of amplifiers to receive the amplified intermediate optical signals and having outputs coupled to corresponding ones of the first plurality of single-mode optical fibers, and a tapered fiber bundle (TFB) coupled to the first plurality of single-mode optical fibers, the TFB including a second plurality of fused single-mode optical fibers correspondingly coupled to the first plurality of single-mode optical fibers at a first end of the TFB, the second plurality of fused single-mode optical fibers capable to receive the WDM optical signals from the first plurality of single-mode optical fibers at the first end and to provide the WDM optical signals to a free space optical communication path at a second end; and a receiver unit along the free space optical communication path, the receiver unit including a multi-mode optical fiber to receive the WDM optical signals provided from the second end of the TFB.

14. A method, comprising:

generating a plurality of wavelength division multiplexing (WDM) optical signals by inputting respective pluralities of optical signals having different wavelengths into respective multiplexers, each respective multiplexer outputting a respective WDM optical signal;

amplifying the respective WDM optical signals to produce respective amplified WDM optical signals;

injecting the respective amplified WDM optical signals into respective single-mode fibers of a first plurality of single-mode optical fibers;

receiving the amplified WDM optical signals from the first plurality of single-mode optical fibers at a first end of a tapered fiber bundle (TFB) comprising a second plurality of fused single-mode optical fibers correspondingly coupled to the first plurality of single-mode optical fibers at a first end of the TFB; and transmitting the WDM optical signals from the second end of the TFB to a free space optical link via a transmit aperture positioned adjacent to the second end of the TFB.

15. The method of claim 14 wherein the amplified WDM optical signals received by each optical fiber of the TFB comprise WDM optical signals that have different wavelengths than wavelengths of WDM optical signals received by other optical fibers of the TFB.

16. The method of claim 14 wherein the amplified WDM optical signals received by each optical fiber of the TFB comprise WDM optical signals that have common wavelengths.

17. The method of claim 14, further comprising injecting a tracking signal into one of the optical fibers of the first plurality of single-mode optical fibers.

18. The method of claim 14, further comprising inputting the respective amplified WDM optical signals into a star coupler, said star coupler outputting optical signals comprising the WDM optical signals injected into the first plurality of single-mode optical fibers.

* * * * *